United States Patent [19]

Kobayashi

[11] Patent Number: 5,130,980
[45] Date of Patent: Jul. 14, 1992

[54] DATA COMMUNICATION SYSTEM WITH PROTECTION OF ERROR PROPAGATION

[75] Inventor: Seiichi Kobayashi, Yokohama, Japan
[73] Assignee: Fujitsu Limited, Tokyo, Japan
[21] Appl. No.: 613,248
[22] Filed: Nov. 14, 1990

[30] Foreign Application Priority Data

Nov. 16, 1989 [JP] Japan ............................ 1-296056

[51] Int. Cl.⁵ ............................................. H04J 3/02
[52] U.S. Cl. ................................... 370/85.1; 371/48
[58] Field of Search ............... 370/79, 84, 13, 84, 370/85.1, 85.15, 94.1, 102; 371/48

[56] References Cited

U.S. PATENT DOCUMENTS

| | | | |
|---|---|---|---|
| 4,567,595 | 1/1986 | Hedlund ........................ | 371/49 |
| 4,885,739 | 12/1989 | Read et al. ..................... | 370/85.1 |
| 4,893,306 | 1/1990 | Chao et al. ..................... | 370/84 |
| 4,922,486 | 5/1990 | Lidinsky et al. ................. | 370/94.1 |
| 4,945,471 | 7/1990 | Neches ........................... | 370/85.15 |
| 4,945,548 | 10/1990 | Iannarone ........................ | 370/102 |
| 5,022,024 | 6/1991 | Paneth et al. ................... | 370/79 |

FOREIGN PATENT DOCUMENTS 60-182238  9/1985  Japan.
2-25136  1/1990  Japan.

Primary Examiner—Benedict V. Safourek
Assistant Examiner—T. Samuel
Attorney, Agent, or Firm—Helfgott & Karas

[57] ABSTRACT

A synchronous communication system includes a plurality of node elements and at least one two-way transmission line. Each of the node elements contains a receiving unit for receiving information which is transmitted on the transmission line; a transmitting unit for transmitting information on the transmission line; a terminal interface, which is operable as an interface between a terminal device and the node element; an error detecting unit for detecting an occurrence of an error in information which is to be supplied to the terminal interface; a pattern generating unit for generating a predetermined pattern for indicating an occurrence of an error; and a selector is provided between the terminal interface and the receiving unit, for selecting the output of the pattern generating unit to supply the selected output to the terminal interface when the error detecting unit detects an error; or selecting the output of the receiving unit to supply the selected output to the terminal interface when the error detecting unit does not detect an error. Further, another selector, provided in a stage preceding the transmitting unit, for receiving the outputs of the pattern generating unit and the terminal interface, and selecting the output of the pattern generating unit to supply the selected output to the transmitting unit when the error detecting unit detects an error; or selecting the output of the terminal interface to supply the selected output to the transmitting unit when the error detecting unit does not detect an error.

21 Claims, 3 Drawing Sheets

DATA COMMUNICATION SYSTEM WITH PROTECTION OF ERROR PROPAGATION

BACKGROUND OF THE INVENTION (1) Field of the Invention

The present invention relates to a management data communication system using an overhead channel in a synchronous optical transmission system, wherein a terminal device can be connected to each node element by a craftsman.

(2) Description of the Related Art

In recently-proposed high-speed synchronous optical networks such as the SONET system, overhead channels are provided for transmitting data for management of the system. The transmission of the management data is carried out, for example, for collecting information on an alarm condition in a node from another node which is remote from the node on which the information is required. In such a system, it is required for an operator to connect a portable terminal device to a node element, and transmit a data request message requiring information on an alarm condition of another node, to the node from which the information is required to be transmitted. Responding to the data request message, the required node returns a message including the information on the alarm condition of the node, to the requiring node. In addition, in the synchronous optical networks, generally, when data is transmitted through a node, the data signal is not simply (physically) repeated, but is read once in the node by the software operation, and is then sent out from node by the software operation. That is, data is passed through a node by a software relay operation. A similar software operation is carried out in each node when the management data is transmitted through the overhead channel.

However, trouble may occur on a transmission line, and the data transmitted through the node may include a damaged portion due to the trouble. Generally, a processor which is provided in each node element to carry out the above data reading and sending operation (software relay operation), is designed to be protective against reception of damaged data so that the processor will not heavily suffer from the damaged data when receiving it, but the above portable terminal device which is used by a craftsman does not have means for protecting itself from the damaged data because of the requirements of small size and low cost for craftsman's tools. When the above damaged data is received in the portable terminal device which is used by the craftsman, the portable terminal device operates abnormally. In this case, the terminal device must stop, and an operation in accordance with an initializing procedure is necessary to restart the operation of the terminal device. That is, a bothersome operation is required for restarting the terminal device when the above damaged data is received.

Therefore, it is required to provide means for protecting against a propagation of the damaged data to the above portable terminal device.

SUMMARY OF THE INVENTION

An object of the present invention is to provide a management data communication system using an overhead channel of a synchronous optical communication system, whereby error propagation to a terminal device used by a craftsman, is protected when the terminal device is connected to a node in the data communication system.

According to the present invention, there is provided a synchronous transmission system comprising: a plurality of node elements; and at least one two-way transmission line, connected between each pair of node elements adjacent to each other among the node elements, and for transmitting information. Each of the node elements comprises: a receiving unit, a transmitting unit, a terminal interface unit, an error detecting unit, a pattern generating unit, and a selector unit. The receiving unit receives information which is transmitted on a transmission line which is connected to the node element. The transmitting unit sends information which is to be output form the node element, on a transmission line which is connected to the node element. The terminal interface unit is operable to connect a terminal device to the node element, and functions as an interface between the terminal device and the transmission unit when information is sent from the terminal device onto the transmission line which is connected to the node element, and functions as an interface between the terminal device and the receiving unit when information to the terminal device, is received from a transmission line. The error detecting unit detects an occurrence of an error in information which is to be supplied to the terminal interface unit. The pattern generating unit generates a predetermined pattern for indication an occurrence of an error. The selector unit is provided between the terminal interface unit and the receiving unit, receives both the outputs of the pattern generating unit and the receiving unit, and selects the output of the pattern generating unit to supply the selected output to the terminal interface unit when the error detecting unit detects an error; or selects the output of the receiving unit to supply the selected output to the terminal interface unit when the error detecting unit does not detect an error.

Further, another selector unit may be provided in a stage preceding the transmitting unit, for receiving the outputs of the pattern generating unit and the terminal interface, and selecting the output of the pattern generating unit to supply the selected output to the transmitting unit when the error detecting unit detects an error; or selecting the output of the terminal interface to supply the selected output to the transmitting unit when the error detecting unit does not detect an error.

DESCRIPTION OF THE PREFERRED EMBODIMENTS

Figure 1:
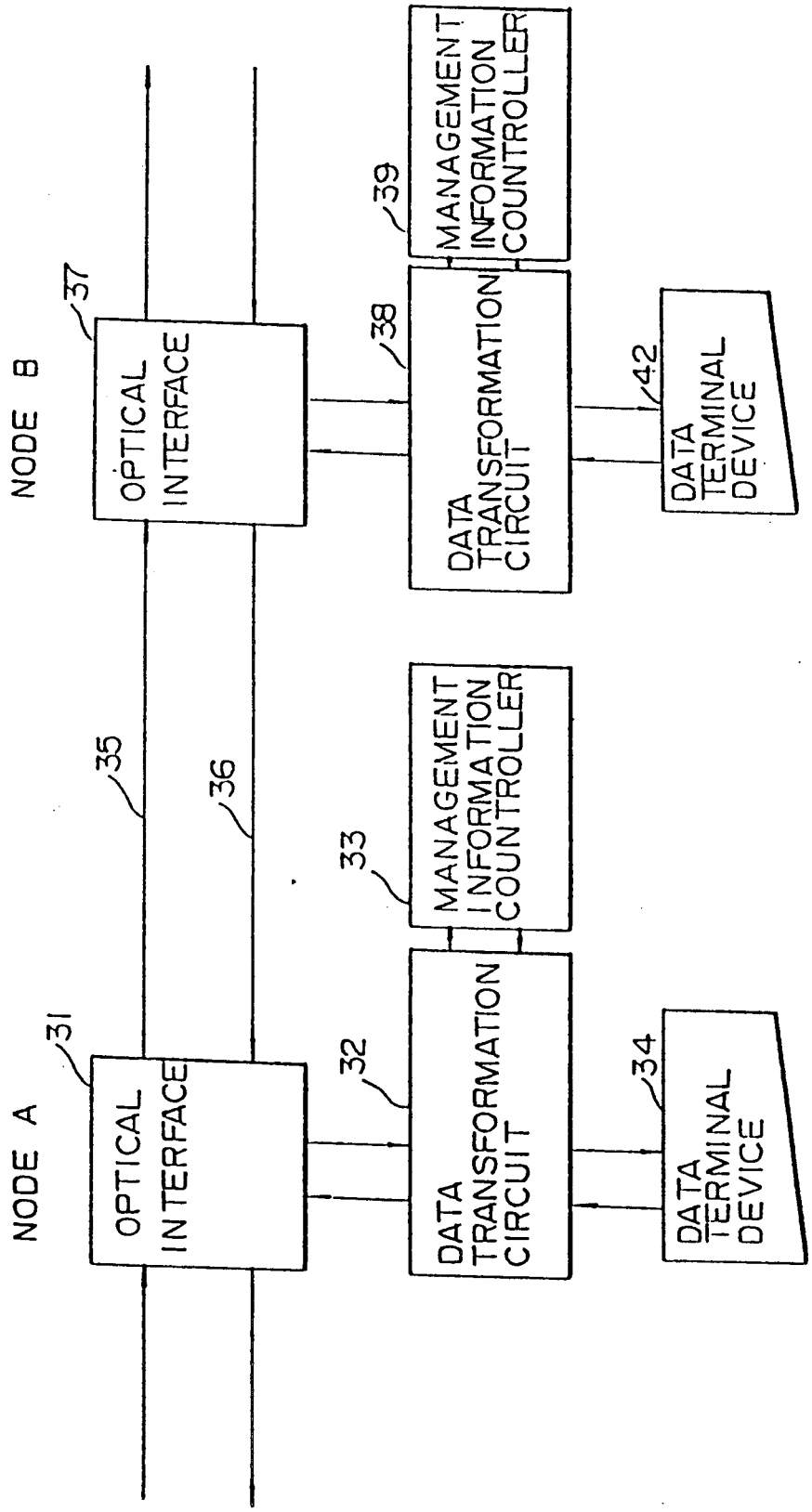
FIG. 1 shows a portion of an example of a construction for management data communication in a synchronous optical communication system, to which the present invention can be applied, where the portion shown in FIG. 1 includes two nodes.

FIG. 1 shows a portion of a construction for management data communication in a synchronous optical communication system, to which the present invention can be applied. The portion shown in FIG. 1 includes two nodes which are denoted by A and B, and FIG. 1 shows a construction relating to communication of management information only. In FIG. 1, reference numeral 31 and 37 each denote an optical interface unit, 32 and 38 each denote a data transformation circuit, 33 and 39 each denote a management information controller, 34 and 42 each denote a data terminal device, and 35 and 36 each denote an optical transmission line. The optical interface unit 31, the data transformation circuit 32, the management information controller 33, and the data terminal device 34 belong to the node A, and the optical interface unit 37, the data transformation circuit 38, the management information controller 39, and the data terminal device 42 belong to the node B.

The optical transmission lines 35 and 36 each transmit a light signal, where the light signal conveys time-division multiplexed signal, for example, as defined in the CCITT recommendation G.707. The time-division multiplexed signal contains signals in channels (pay load) for use by network entities of the synchronous optical communication system, and in overhead channels for use by a network provider for managing the synchronous optical communication system, and the overhead channels contain channels for transmitting management information between remote nodes. The optical interface units 31 and 32 each carry out a transformation between a light signal and an electric signal, extract timing information from the light signal transmitted on the optical transmission lines 35 and 36, and carry out multiplexing and demultiplexing operations of data in the above channels. The data transformation circuits 32 and 38 each transform bit rates between the side of the optical interface and the side of the management information controller and the data terminal device. The data terminal devices 34 and 42 are each provided for craftsmen to collect management information on the node to which the data terminal device is connected, and the other nodes which are remote from the node to which the data terminal device is connected.

By the construction of FIG. 1, for example, a craftsman can input a message at a data terminal device 34 which is connected to the node A, requesting management information on the remote node B. When the management information controller 39 in the node B receives the above message, the management information controller 39 returns a message containing the requested management information on the node B to the data terminal device 34 at the node A. However, since the above data terminal device which is used by a craftsman may be portable and small, and does not have means for protecting itself from damaged data, as explained before, when trouble occurs on an optical transmission line, data transmitted through the node is damaged by the trouble, and the above damaged data is received in the data terminal device, the data terminal device operates abnormally. In this case, the terminal device must stop, and a troublesome initializing operation is necessary to restart the operation of the terminal device.

Therefore, according to the present invention, means for protecting against a propagation of the damaged data to the above data terminal device, is provided in each node element, as explained below.

Figure 2:
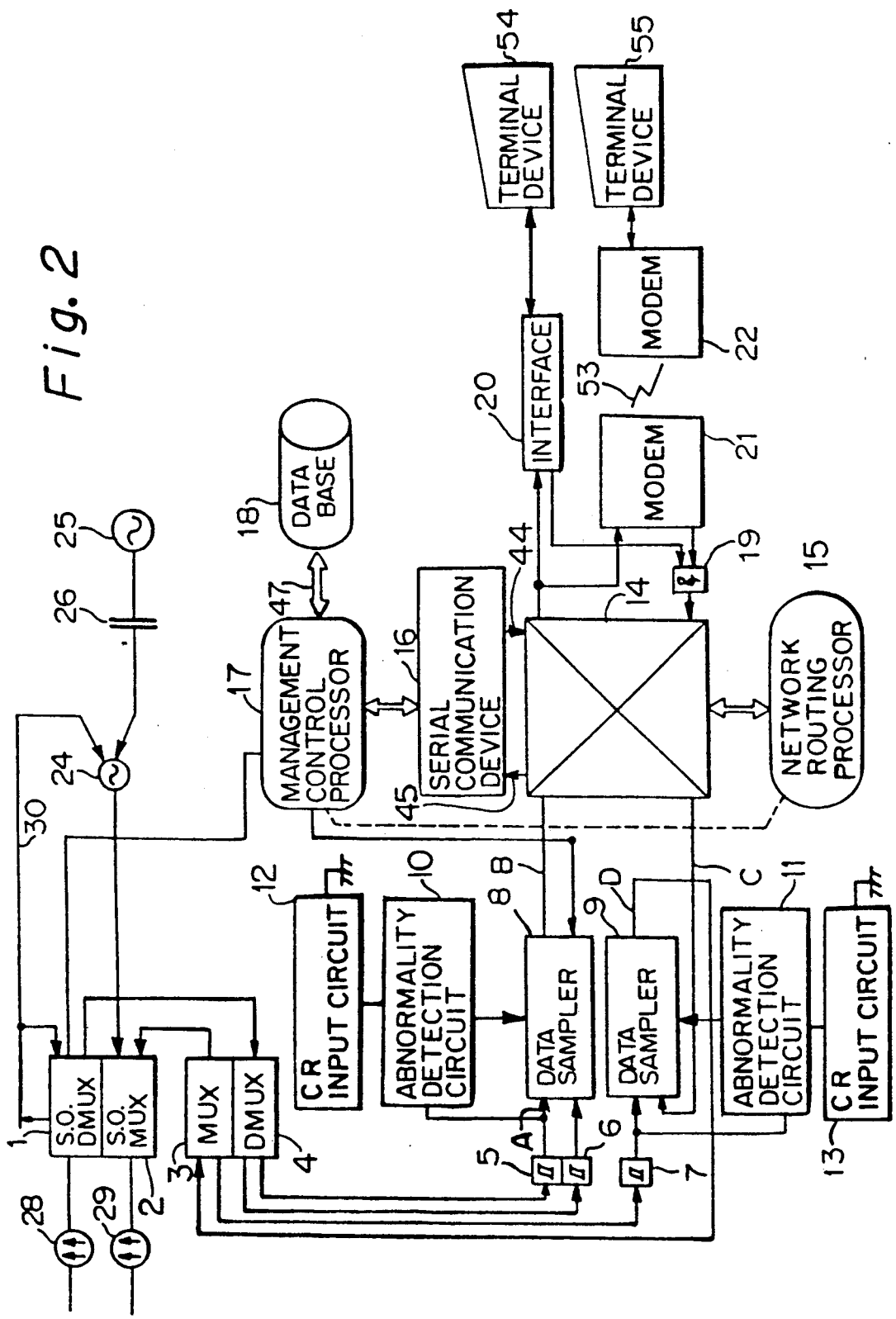
FIG. 2 shows a detailed construction of each node element in the network in the embodiment of the present invention.

FIG. 2 shows a detailed construction of each node element in the embodiment of the present invention. In FIG. 2, only the construction relating to the operation for transmitting management information, is shown. In FIG. 2, reference numeral 28 and 29 each denote an optical transmission line, 1 denotes a synchronous optical demultiplexer, 2 denotes a synchronous optical multiplexer, 3 denotes a multiplexer portion in the overhead accesser, 4 denotes a demultiplexer portion of the overhead accesser, 5, 6, and 7 each denote a Schmidt trigger circuit for a data sampler, 8 and 9 denotes a data sampler, 10 and 11 each denote an abnormality detecting circuit, 12 and 13 each denote a CR input, 14 denotes a link connection device, 15 denotes a network routing processor, 16 denotes a serial communication device, 17 denotes a management control processor, 18 denotes a data base, 19 denotes a logical AND circuit, 20 denotes an EIA232 interface, 21 and 22 each denote a MODEM, 24 denotes a PLL circuit, 25 denotes a clock source of the Building Integrated Timing Supply system (BITS), and 53 denotes a public or private analog transmission line.

The synchronous optical demultiplexer 1 demultiplexes the above-mentioned time-division multiplexed signal transmitted on the optical transmission line 28 into the signal in the channels (pay load) for use by the network entities, and the overhead channels for use by the network provided for managing the synchronous optical communication system, and the synchronous optical demultiplexer 1 contains a timing extracting circuit (not shown) which extracts timing information from the light signal transmitted on the optical transmission line 28, a Manchester code signal generating circuit (not shown) which transforms the demultiplexed signal in the overhead channels into a Manchester code signal which includes the above exacted timing information, to send the transformed signal to the demultiplexer portion 4 of the overhead accesser.

The PLL receives a timing signal which is extracted from the light signal transmitted on the optical transmission line 28 in the synchronous optical demultiplexer 1, or a clock signal supplied from the Building Integrated Timing Supply system (BITS) 25 through an interface 26, as a reference clock, and generates a clock signal to be supplied to the synchronous optical multiplexer 2.

The demultiplexer portion 4 of the overhead accesser receives the above-mentioned signals in the overhead channels in the form of the Manchester code signal, and demultiplexes the received signal into signals in one or more channels for use in transmitting the management information, and signals in the other channels. At the same time, the demultiplexer portion 4 of the overhead accesser transforms the above Manchester code signal into a data signal and a clock signal which is generated based on the above timing information included in the Manchester code signal. The data signal and the clock signal generated in the demultiplexer portion 4 of the overhead acesser, are supplied to the data sampler 8 after shaped in the Schmidt trigger circuits 5 and 6, respectively.

Each shaped data signal is written in the data sampler 8 at the timing of the clock signal, and the written data is output from the data sampler 8 at the timing of a clock signal of the management control processor 17 and the data terminal devices 54 and 55. The output of the data sampler 8 is read by the management control processor 17 through the link connection device 14, or is read by the data terminal device 54 or 55 through the link connection device 14 and the EIA232 interface or the public or private analog transmission line 53. The data terminal device 55 is located remote from the node element, and is connected to the node element through the MODEMS 21 and 22, and the public or private analog transmission line 53. The link connection device 14 can realize one of connection modes: a connection of the output of the data sampler 8 to the management control processor 17; a connection of the output of the data sampler 8 to the data terminal device 54 or 55; a connection of the output of the data terminal device 54 or 55 to the management control processor 17; a connection of the output of the data terminal device 54 or 55 to the data sampler 9; a connection of the output of the management control processor 17 to the data sampler 9; and a connection of the output of the management control processor 17 to the data terminal device 54 or 55. The network routing processor 15 controls the connection mode in the link connection device 14 according to requests from the management control processor 17 and the data terminal device 54 or 55.

The signal which is to be sent to another node from the management control processor 17, or the data terminal device 54 or 55, is written in the data sampler 9 at the timing of the clock signal of the management control processor 17 and the data terminal devices 54 and 55. The signal written in the data sampler 9 is output from the data sampler 9 at the timing of the clock signal which is supplied from the multiplexer portion 3 in the overhead accesser through the Schmidt trigger circuit 7, and is the same as the above-mentioned clock signal output from the demultiplexer portion 4 in the overhead accesser. The multiplexer portion 3 in the overhead accesser multiplexes the above output from the data sampler 9 into the above-mentioned channel for transmitting management information, with the other signals which are to be sent on the optical transmission line 29 in the overhead channels, and the multiplexed signal is sent to the synchronous optical multiplexer 2 in the form of Manchester signal, where the overhead accesser is constituted by the above demultiplexer portion 4 and the multiplexer portion 4. The synchronous optical multiplexer 2 multiplexes the above signals in the overhead channels sent from the multiplexer portion 3 of the overhead accesser, with the other signals which are to be transmitted in the pay load, using the clock signal supplied from the PLL circuit 24. The multiplexed signal is transmitted onto the optical transmission line 29 in the form of optical signal.

The above clock signals from the demultiplexer portion 4 and the multiplexer portion 3 in the overhead accesser are respectively supplied to the abnormality detecting circuits 10 and 11. The abnormality detecting circuits 10 and 11 are respectively connected to the CR circuits 12 and 13, and the CR circuits are respectively charged responding to the rising of the corresponding clock signals. The abnormality detecting circuits 10 and 11 respectively monitor output levels of the corresponding CR circuits 12 and 13. When the clock signals stop, or the frequency of the clock signal is decreased due to trouble which may occur in a stage before the inputs of the abnormality detecting circuits 10 and 11, the output level is lowered, and the abnormality detecting circuits 10 and 11 detect the lowered level as an occurrence of error. When the abnormality detecting circuit 10 or 11 detects the above lowered level, the abnormality detecting circuit 10 or 11 makes the corresponding data sampler 8 or 9 output a predetermined pattern which indicates an occurrence of error instead of its normal output as explained above.

In addition, the synchronous optical demultiplexer 1 also contains an error rate monitoring circuit (not shown) which monitors an error rate in the signal transmitted on the optical transmission line 28. When the error rate monitoring circuit detects that the error rate exceeds a predetermined level, the detected result is informed to the management control processor 17. Receiving the detection result, the management control processor 17 makes the data sampler 8 output the above predetermined pattern which indicates an occurrence of error instead of its normal output as explained above.

Figure 3:
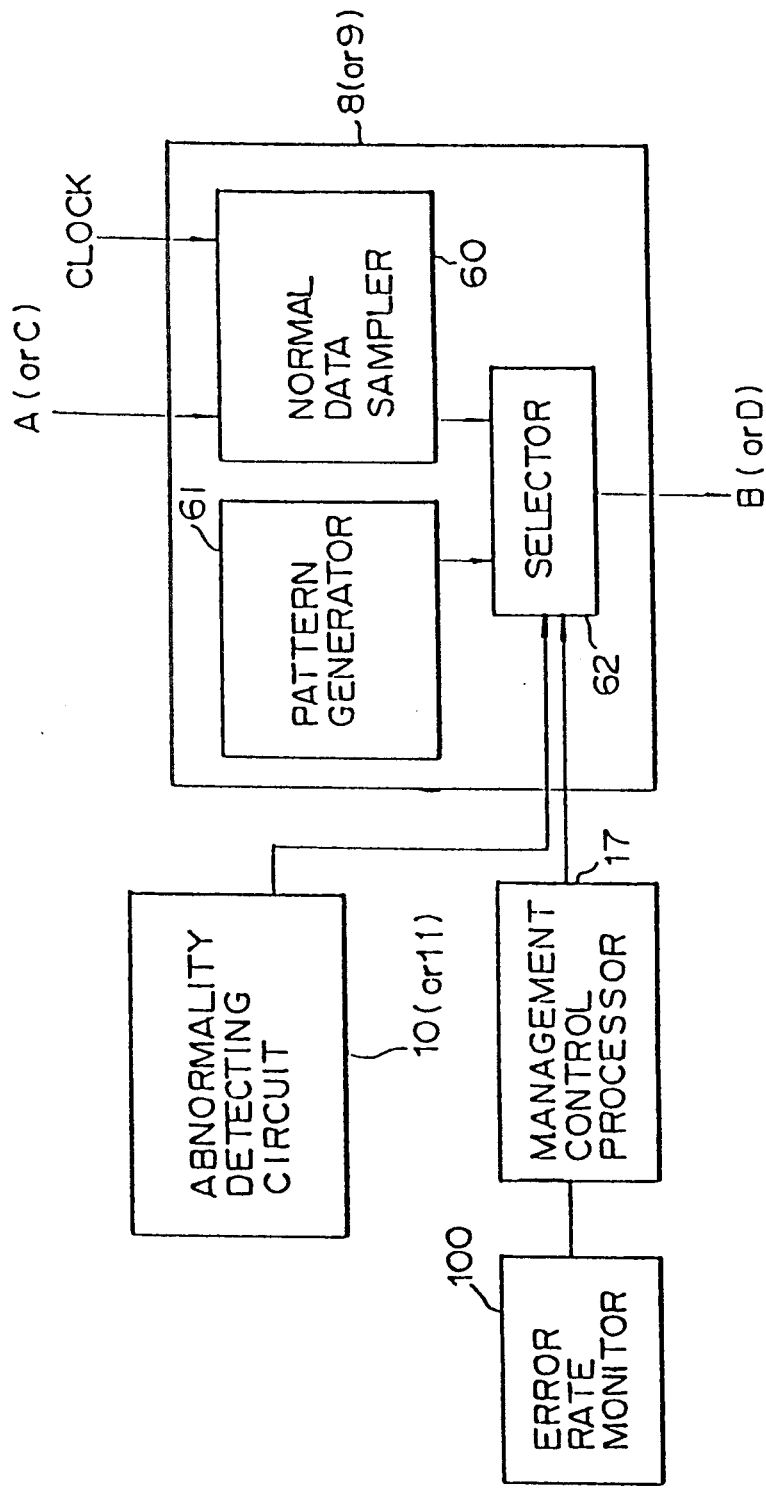
FIG. 3 shows an example of the construction of the data sampler in FIG. 2

FIG. 3 shows an example of the construction of the data sampler 8 in FIG. 2. In FIG. 3, reference numeral 60 denotes a normal data sampler, 61 denotes a pattern generator, 62 denotes a selector, and 100 denotes the above-mentioned error rate monitoring circuit contained in the synchronous optical demultiplexer 1. In addition, A denotes the above-mentioned input of the data sampler 8, and B denotes the above-mentioned output of the data sampler 8. As shown in FIG. 3, the data sampler 8 in the construction of FIG. 2 contains the normal data sampler 60, the pattern generator 61, and the selector 62. The normal data sampler 60 inputs the data signal at the timing of the clock signal from the demultiplexer portion 4 of the overhead accesser, and outputs the data at the timing of the management control processor 17 or the data terminal device 54 or 55, as explained above. The pattern generator 61 generates the above-mentioned predetermined pattern which indicates an occurrence of error. The selector 62 receives the outputs of the normal data sample 60 and the pattern generator 61, and outputs one of the received outputs as the output of the data sampler 8. The selector 62 receives the output of the above-mentioned abnormality detecting circuit 10, and the above-mentioned control by the management control processor 17 corresponding to the detection of the excess of the error rate over the predetermined level. When the abnormality detecting circuit 10 detects the occurrence of error in the clock signal, or when the excess of the error rate over the predetermined level is detected, the selector 62 selects, as its output, the output of the pattern generator 61. When neither the above occurrence of error in the clock signal, nor the excess of the error rate over the predetermined level, is detected, the selector 62 selects, as its output, the output of the normal data sampler 60.

The data sampler 9 has a construction similar to the construction of the data sampler 8 as explained above, except that selector 62 does not receive the above outputs from the abnormality detecting circuit 10 or the management control processor 17, and receives the output of the abnormality detecting circuit 11 only.

According to the above construction, when trouble has occurred in a stage before the inputs of the data sampler 8, for example, on the optical transmission line 28, or in the signal path from the synchronous optical demultiplexer 1 to the data sampler 8, the trouble is detected as an abnormality of the clock signal in the abnormality detecting circuit 10, and the data sampler 8 outputs the above-mentioned predetermined pattern instead of the data signal which may include a damaged portion. Therefore, the data terminal device 54 or 55 does not receive the damaged data, and receives the predetermined pattern. Similarly, when abnormality of the clock signal is detected in the abnormality detecting circuit 11, the data sampler 9 outputs the above-mentioned predetermined pattern instead of the data signal which may include a damaged portion. Therefore, the predetermined pattern is transmitted through the aforementioned channel for transmitting management information, to another node. Thus, data terminal device which is connected to the node to which the above predetermined pattern is transmitted through the optical transmission line, also receives the predetermined pattern. The data terminal devices which are connected to the nodes of the synchronous optical transmission system are programmed to temporarily hold their operation, and go into a state for waiting for a next instruction. Namely, data terminal devices does not operate abnormally due to the above damaged data. The predetermined pattern may be, for example, an all "1" pattern, in this example.

In the above operation, when a bit error is included in the above pattern which is transmitted from another node to a node having the construction of FIG. 2 for informing the occurrence of an error, the data terminal device does not operate as above responding to the pattern. The aforementioned control of the data sampler 8 by the management control processor 17 responding to the detection of the excess of the error rate over the predetermined level, is carried out for protecting the data terminal device for the above inclusion of the bit error in the pattern. Namely, according to the above control by the management control processor 17, when the error rate in the signal on the optical transmission line 28 exceeds the predetermined level, the predetermined pattern is output from the data sampler 8, and therefore, the data terminal devices 54 and 55 are informed of the detection of an error in another node, and are protected against the damaged data, even when the above pattern informing of the detection of the error is damaged by the bit error.

I claim:

1. A synchronous transmission system comprising:
   a plurality of node elements; and
   at least one two-way transmission line connected between each pair of node elements adjacent to each other among said node elements and transmitting information;
   each of said node elements comprising:
   a receiving means for receiving information which is transmitted on a transmission line which is connected to the node element;
   a transmitting means for transmitting information which is to be output from said node element, on a transmission line which is connected to the node element;
   a terminal interface means, which is operable to connect a terminal device to the node element, and operable to function as an interface between said terminal device and said transmitting means when information is sent from the terminal device to the transmission line which is connected to the node element, and as an interface between said terminal device and said receiving means when information to the terminal device is received from a transmission line;
   an error detecting means for detecting an occurrence of an error in information which is to be supplied from one of said plurality of node elements other than said node element to said terminal interface means;
   a pattern generating means for generating a predetermined pattern for indicating an occurrence of an error; and
   a selector means, provided between said terminal interface means and said receiving means, for receiving outputs of said pattern generating means and said receiving means and selecting either an output of said pattern generating means to supply the output of said pattern generating means to said terminal interface means when said error detecting means detects an error or an output of said receiving means to supply the output of said receiving means to said terminal interface means when said error detecting means does not detect an error.

2. A node element provided in a synchronous transmission system which comprises a plurality of further node elements, and at least one two-way transmission line connected between each pair of node elements adjacent to each other among node elements in said synchronous transmission system and transmitting information;
   said node element comprising:
   a receiving means for receiving information which is transmitted on a transmission line which is connected to the node element;
   a transmitting means for transmitting information which is to be output from said node element, on a transmission line which is connected to the node element;
   a terminal interface means, which is operable to connect a terminal device to the node element, and operable to function as an interface between said terminal device and said transmitting means when information is sent from the terminal device to the transmission line which is connected to said node element, and as an interface between said terminal device and said receiving means when information to the terminal device is received from a transmission line;
   an error detecting mens for detecting an occurrence of an error in information which is to be supplied from one of said plurality of further node elements to said terminal interface means;
   a pattern generating means for generating a predetermined pattern for indicating an occurrence of an error; and
   a selector means, provided between said terminal interface means and said receiving means, for receiving outputs of said pattern generating means and said receiving means, and selecting either an output of said pattern generating means to supply the output of said pattern generating means to said terminal interface means when said error detecting means detects an error or an output of said receiving means to supply the output of said receiving means to said terminal interface means when said error detecting means does not detect an error.

3. A synchronous transmission system according to claim 1, wherein said each of said node elements further comprises a second selector means, provided in a stage preceding said transmitting means, for receiving the outputs of said pattern generating means and said terminal interface means, and selecting the output of said pattern generating means to supply the selected output to said transmitting means when said error detecting means detects an error or selecting the output of said terminal interface means to supply the output of said terminal interface means to said transmitting means when said error detecting means does not detect an error.

4. A synchronous transmission system according to claim 1, wherein said receiving means comprises a clock signal obtaining means for obtaining a receiving clock signal which is included in the information received from said transmission line, and said error detecting means comprises a degraded clock detecting means for detecting a degradation in said receiving clock signal which is obtained by said clock signal obtaining means.

5. A synchronous transmission system according to claim 1, wherein said error detecting means is contained in said receiving means as an error rate monitoring means for monitoring a bit error rate in the information which is received by the receiving means and detecting, as an occurrence of error, that the monitored error rate is over a predetermined level.

6. A synchronous transmission system according to claim 1, wherein said receiving means comprises:
   a clock signal obtaining means for obtaining a receiving clock signal which is included in the information received from said transmission line, and
   an error rate monitoring means for monitoring a bit error rate in the information which is received by the receiving means and detecting, as an occurrence of an error, that the monitored error rate is over a predetermined level;
   said synchronous transmission system further comprising a degraded clock detecting means for detecting a degradation in said receiving clock signal which is obtained by said clock signal obtaining means; and
   said degraded clock detecting means and said error rate monitoring means constituting said error detecting means.

7. A synchronous transmission system comprising:
   a plurality of node elements; and
   a plurality of two-way transmission lines, connected between each pair of node elements adjacent to each other among said node elements and transmitting information;
   each of said node elements comprises:
      a receiving means for receiving information which is transmitted on a transmission line which is connected to the node element;
      a transmitting means for transmitting information which is to be output from said node element, on a transmission line which is connected to the node element;
      a management control processor for controlling management data for managing the node element, receiving management information which is supplied through said receiving means, and transmitting said management information out through said transmitting means to one of said plurality of node elements;
      a terminal interface means, which is operable to connect a terminal device to the node element and operable to function as an interface between said terminal device and said transmitting means when information is sent from the terminal device to the transmission line which is connected to the node element, and as an interface between said terminal device and said receiving means when information to the terminal device is received from a transmission line;
      a first selector means for receiving an output of said receiving means, detecting an address which is included in the output of said receiving means, and supplying its output to one of said terminal interface means and said management control processor, according to the address;
      a second selector means for receiving outputs of said terminal interface means and said management control processor, and supplying the output of one of said terminal interface means and said management control processor to said transmitting means, according to requests from either of said terminal interface means and said management control processor;
      an error detecting means for detecting an occurrence of an error in information which is to be supplied from one of said plurality of node elements other than said node element, to said terminal interface means;
      a pattern generating means for generating a predetermined pattern for indicating an occurrence of an error; and
      a third selector means, provided between said first selector means and said receiving means, for receiving outputs of said pattern generating means and said receiving means, and selecting either an output of said pattern generating means to supply the selected output to said first selector means when said error detecting means detects an error or an output of said receiving means to supply the output of said receiving means to said first selector means when said error detecting means does not detect an error.

8. A node element provided in a synchronous transmission system which comprises a plurality of further node elements, and at least one two-way transmission line connected between each pair of node elements adjacent to each other among the node elements in said synchronous transmission system and transmitting information;
   said element comprising:
      a receiving means for receiving information which is transmitted on a transmission line which is connected to the node element;
      a transmitting means for transmitting information which is to be output from said node element, on a transmission line which is connected to the node element;
      a management control processor for controlling management data for managing the node element, receiving management information which is supplied through said receiving means, and transmitting management information out through said transmitting means to one of said plurality of further node elements;
      a terminal interface means which is operable to connect a terminal device to the node element, and operable to function as an interface between said terminal device and said transmitting means when information is sent from the terminal device to the transmission line which is connected to the node element, and as an interface between said terminal device and said receiving means when information to the terminal device is received from a transmission line;
      a first selector means for receiving an output of said receiving means, detecting an address which is included in the output of said receiving means, and supplying its output to one of said terminal interface means and said management control processor, according to the address;
      a second selector means for receiving outputs of said terminal interface means and said management control processor, and supplying one of said outputs of said terminal interface means and said management control processor to said transmitting means, according to requests from either of said terminal interface means and said management control processor;

an error detecting means for detecting an occurrence of an error in information which is to be supplied from one of said plurality of further node elements to said terminal interface means;

a pattern generating means for generating a predetermined pattern for indicating an occurrence of an error; and a third selector means, provided between said first selector means and said receiving means, for receiving outputs of said pattern generating means and said receiving means, and selecting either an output of said pattern generating means to supply the selected output to said first selector means when said error detecting means detects an error or an output of said receiving means to supply the output of said receiving means to said first selector means when said error detecting means does not detect an error.

9. A synchronous transmission system according to claim 7, wherein said each of the node elements further comprises a fourth selector means, provided in a stage preceding said transmitting means, for receiving the outputs of said pattern generating means and said terminal interface means, and selecting the output of said pattern generating means to supply the selected output to said tansmitting means when said error detecting means detects an error or selecting the output of said second selector means to supply the output of said second selector means to said transmitting means when said error detecting means does not detect an error.

10. a synchronous transmission system according to claim 7, wherein said receiving means comprises a clock signal obtaining means for obtaining a receiving clock signal which is included in the information received from said transmission line, and said error detecting means comprises a degraded clock detecting means for detecting a degradation in said receiving clock signal which is obtained by said clock signal obtaining means.

11. A synchronous transmission system according to claim 7, wherein said error detecting means is contained in said receiving means as an error rate monitoring means for monitoring a bit error rate in the information which is received by the receiving means and detecting, as an occurrence of error, that the monitored error rate is over a predetermined level.

12. A synchronous transmission system according to claim 7, wherein said receiving means comprises:

a clock signal obtaining means for obtaining a receiving clock signal which is included in the information received from said transmission line, and an error rate monitoring means for monitoring a bit error rate in the information which is received by the receiving means and detecting, as an occurrence of an error, that the monitored error rate is over a predetermined level;

said synchronous transmission system further comprising a degraded clock detecting means for detecting a degradation in said receiving clock signal which is obtained by said clock signal obtaining means; and said degraded clock detecting means and said error rate monitoring means constituting said error detecting means.

13. A synchronous transmission system comprising:

a plurality of node elements; and a plurality of two-way transmission lines connected between each pair of node elements adjacent to each other among said node elements and transmitting synchronous time-multiplexed data containing data in channels for use by network entities of said synchronous transmission system, and management information in overhead channels;

each of said node elements comprises:

a demultiplexer means for demultiplexing said synchronous time-multiplexed data which is transmitted on a transmission line which is connected to the node element, and obtaining said management information in overhead channels;

a management control processor for controlling management data for managing the node element, receiving management information which is supplied through said receiving means, and transmitting management information out through said transmitting means to one of said plurality of node elements;

a multiplexer means for multiplexing said management information which is sent out from said management control processor, with other data which is to be output from said node element, to generate synchronous time-multiplexed data which is to be output from said node element, on a transmission line which is connected to the node element;

a terminal interface means, which is operable to connect a terminal device thereto, and operable to function as an interface between said terminal device and said multiplexer means when management information is sent to a transmission line which is connected to the node element, from the node element throught the terminal interface means and the multiplexer means, and as an interface between said terminal device and said demultiplexer means when management information from a transmission line which is connected to the node element, is received at the demultiplexer means through the demultiplexer means and the terminal interface means;

a first selector means for receiving an output of said demultiplexer means, detecting an address which is included in the output of said demultiplexer means, and supplying its output to one of said terminal interface means and said management control processor, according to the address;

a second selector means for receiving outputs of said terminal interface means and said management control processor and supplying one of said outputs of said terminal interface means and said management control processor to said multiplexer means, according to requests from either of said terminal interface means and said management control processor;

an error detecting means for detecting an occurrence of an error in information which is to be supplied from one of said plurality of node elements other than said node element, to said terminal interface means;

a pattern generating means for generating a predetermined pattern for indicating an occurrence of an error; and a third selector means, provided between said first selector means and said demultiplexer means, for receiving outputs of said pattern generating means and said demultiplexer means and selecting either an output of said pattern generating means to supply the selected output to said first selector means when said error detecting means detects an error or an output of said demultiplexer means to supply the output of said demultiplexer means to said first selector means when said error detecting means does not detect an error.

14. A node element provided in a synchronous transmission system which comprises a plurality of further node elements, and at least one two-way transmission line connected between each pair of node elements adjacent to each other among the node elements in said synchronous transmission system and transmitting synchronous time-multiplexed data containing data in channels for use by network entities of said synchronous transmission system, and management information in overhead channels;

said node element comprising:
a demultiplexer means for demultiplexing said synchronous time-multiplexed data which is transmitted on transmission line which is connected to the node element, and obtaining said management information in overhead channels;
a management control processor for controlling management data for managing the node element, receiving management information which is supplied through said receiving means, and transmitting management information out through said transmitting means to one of said plurality of node elements;
a multiplexer means for multiplexing said management information which is sent out from said management control processor, with other data which is to be output from said node element, to generate synchronous time-multiplexed data which is to be output from said node element, on a transmission line which is connected to the node element;
a terminal interface means, which is operable to connect a terminal device thereto and operable to function as an interface between said terminal device and said multiplexer means when management information is sent to a transmission line which is connected to the node element, from the node element through the terminal interface means and the multiplexer means, and as an interface between said terminal device and said demultiplexer means when management information from a transmission line which is connected to the node element, is received at the demultiplexer means through the demultiplexer means and the terminal interface means;
a first selector means for receiving an output of said demultiplexer means, detecting an address which is included in the output of said demultiplexer means, and supplying its output to one of said terminal interface means and said management control processor, according to the address;
a second selector means for receiving outputs of said terminal interface means and said management control processor and supplying one of said outputs of said terminal interface means and said management control processor to said multiplexer means, according to requests from either of said terminal interface means and said management control processor;
an error detecting means for detecting an occurrence of an error in information which is to be supplied from one of said plurality of further node elements to said terminal interface means;
a pattern generating means for generating a predetermined pattern for indicating an occurrence of an error; and
a third selector means, provided between said first selector means and said demultiplexer means, for receiving outputs of said pattern generating means and said demultiplexer means, and selecting either an output of said pattern generating means to supply the selected output to said first selector means when said error detecting means detects an error or an output of said demultiplexer means to supply the output of said demultiplexer means to said first selector means when said error detecting means does not detect an error.

15. A synchronous transmission system according to claim 13, further comprising a fourth selector means, provided in a stage preceding said multiplexer means, for receiving the outputs of said pattern generating means and said terminal interface means, and selecting the output of said pattern generating means to supply the selected output to said multiplexer means when said error detecting means detects an error; or selecting the output of said second selector means to supply the selected output to said multiplexer means when said error detecting means does not detect an error.

16. A synchronous transmission system according to claim 13, wherein said demultiplexer means comprises a clock signal obtaining means for obtaining a receiving clock signal which is included in the information received from said transmission line, and said error detecting means comprises a degraded clock detecting means for detecting a degradation in said receiving clock signal which is obtained by said clock signal obtaining means.

17. A synchronous transmission system according to claim 13, wherein said error detecting means is contained in said demultiplexer means as an error rate monitoring means for monitoring a bit error rate in the information which is received by the demultiplexer means and detecting, as an occurrence of error, that the monitored error rate is over a predetermined level.

18. A synchronous transmission system according to claim 13, wherein said demultiplexer means comprises:
a clock signal obtaining means for obtaining a receiving clock signal which is included in the information received from said transmission line, and
an error rate monitoring means for monitoring a bit error rate in the information which is received by the demultiplexer means and detecting, as an occurrence of an error, that the monitored error rate is over a predetermined level;
said synchronous transmission system further comprising a degraded clock detecting means for detecting a degradation in said receiving clock signal which is obtained by said clock signal obtaining means; and
said degraded clock detecting means and said error rate monitoring means constituting said error detecting means.

19. A node element according to claim 2, further comprising a seocnd selector means, provided in a stage preceding said tramsmitting means, for receiving outputs of said pattern generating means and said terminal interface means, and selecting either an output of said pattern generating means to supply the selected output to said transmitting means when said error detecting means detects an error or an output of said terminal interface means to said transmitting means when said error detecting means does not detect an error.

20. A node element according to claim 8, further comprising a fourth selector means, provided in a stage preceding said transmitting means, for receiving outputs of said pattern generating means and said terminal interface means, and selecting either an output of said pattern generating means to supply the selected output to said transmitting means when said error detecting means detects an error or an output of said second selector means to supply the output of said second selector means to said transmitting means when said error detecting means does not detect an error.

21. A node element according to claim 14, further comprising a fourth selector means, provided in a stage preceding said multiplexer means, for receiving outputs of said pattern generating means and said terminal interface means, and selecting either an output of said pattern generating means to supply the selected output to said multiplexer means when said error detecting means detects an error or an output of said second selector means to supply the output of said second selector means to said multiplexer means when said error detecting means does not detect an error.

* * * * *